United States Patent [19]

Grabbe et al.

[11] Patent Number: 4,741,591
[45] Date of Patent: May 3, 1988

[54] OPTICAL FIBER CONNECTOR

[75] Inventors: Dimitry Grabbe, Middletown; Johannes C. W. Bakermans, Harrisburg; James D. Kevern, Wellsville, all of Pa.

[73] Assignee: AMP Incorporated, Harrisburg, Pa.

[21] Appl. No.: 683,848

[22] Filed: Dec. 20, 1984

[51] Int. Cl.⁴ ............................................. G02B 6/38
[52] U.S. Cl. ................................................. 350/96.21
[58] Field of Search .................. 350/96.20, 96.21, 96.22

[56] References Cited

U.S. PATENT DOCUMENTS

| | | | |
|---|---|---|---|
| 4,033,668 | 7/1977 | Presby | 350/96.21 |
| 4,147,404 | 4/1979 | Hensel | 350/96.21 |
| 4,148,553 | 4/1979 | Asam | 350/96.21 |
| 4,181,401 | 1/1980 | Jensen | 350/96.21 |
| 4,274,708 | 6/1981 | Cocito et al. | 350/96.21 |
| 4,353,619 | 10/1982 | Parr | 350/96.21 |
| 4,458,984 | 7/1984 | Roberts et al. | 350/96.21 |
| 4,460,820 | 7/1984 | Matsumoto et al. | 350/96.21 X |
| 4,544,234 | 10/1985 | DeVeau, Jr. et al. | 350/96.21 |
| 4,585,304 | 4/1986 | Winter et al. | 350/96.21 |
| 4,618,212 | 10/1986 | Ludington et al. | 350/96.21 |

FOREIGN PATENT DOCUMENTS

| | | | |
|---|---|---|---|
| 52-25646 | 2/1977 | Japan | 350/96.21 |
| 0007251 | 1/1978 | Japan | 350/96.21 |
| 55-156908 | 12/1980 | Japan | 350/96.21 |

OTHER PUBLICATIONS

Cook, J., "Making Low-Loss Single-Mode Connectors," *Laser Focus/Electro-Optics*, vol. 19, No. 10, (10/1983), pp. 123-128.

*Primary Examiner*—John Lee
*Attorney, Agent, or Firm*—Bruce J. Wolstoncroft

[57] ABSTRACT

A connector, method and alignment device for connecting single-mode optical fibers are provided. The connector is characterized by a deformable, elongated base for supporting two coaxial fibers and a meltable slug which secures the fibers to the base in a nondamageable manner upon melting and resolidification. The method addresses employing the connector to affix the fibers. The device, employed in combination with the connector, includes two translatable clamps to distort the connector base thereby aligning the fibers optical cores in a substantially coaxial relationship.

32 Claims, 4 Drawing Sheets

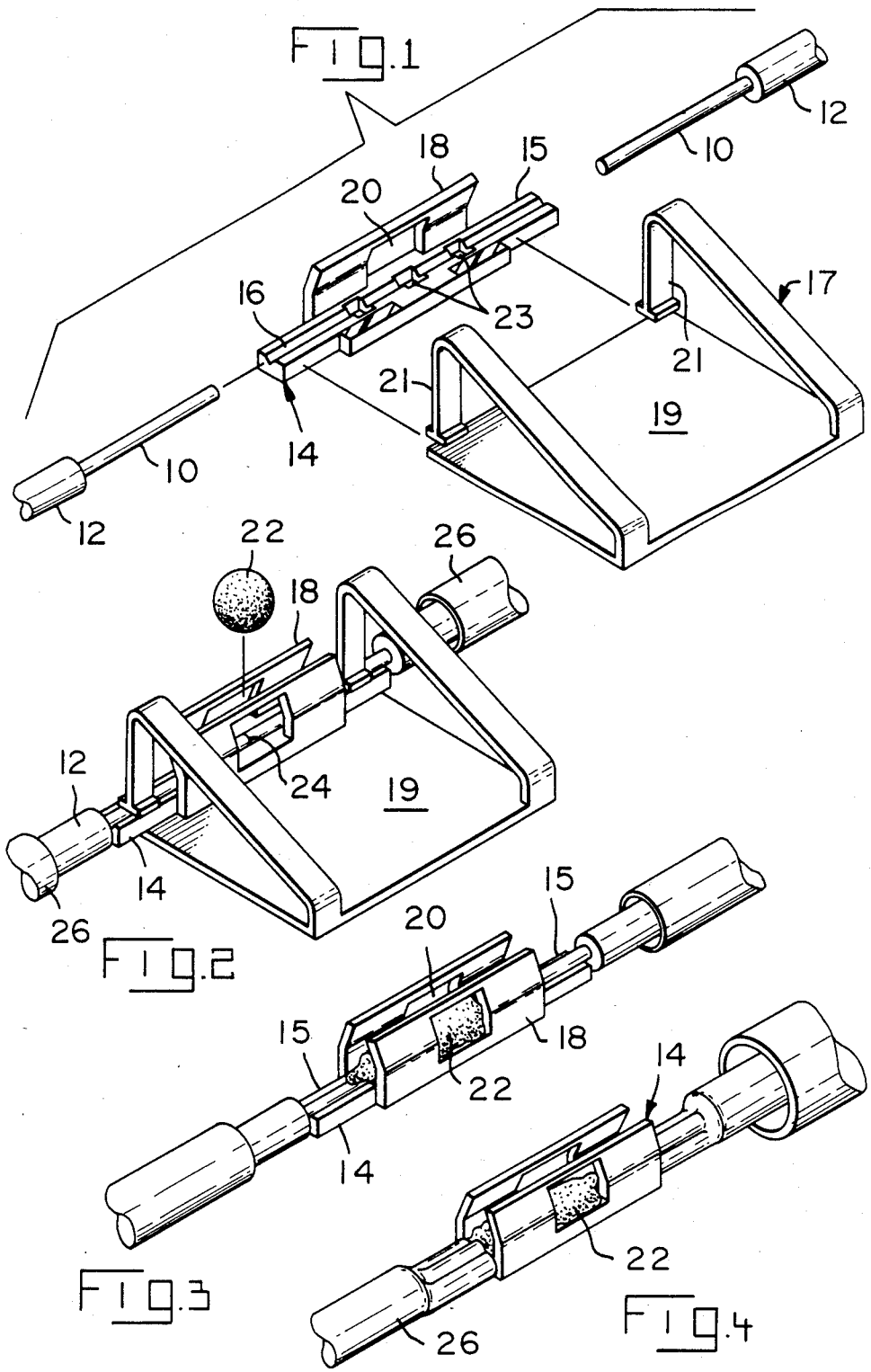

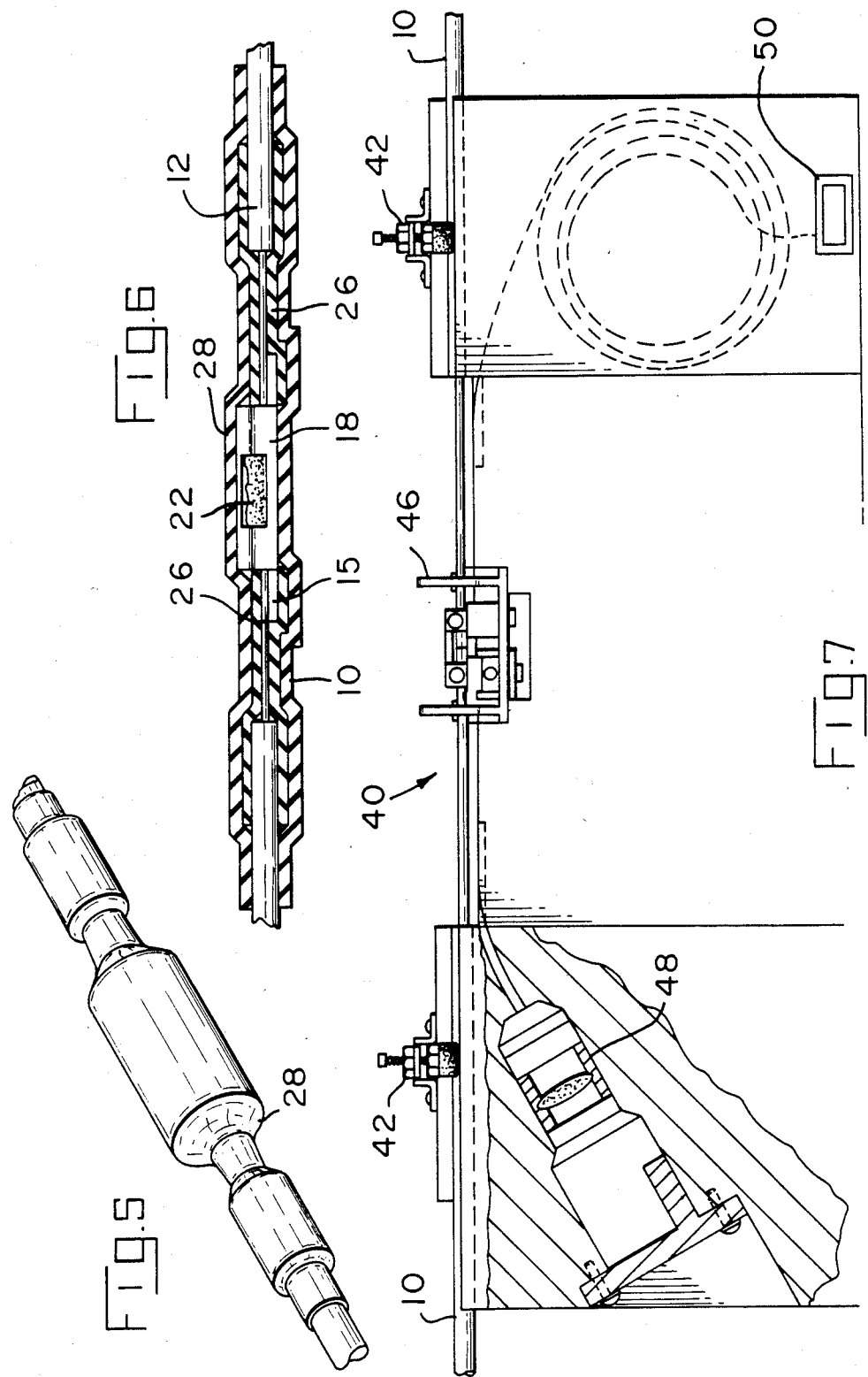

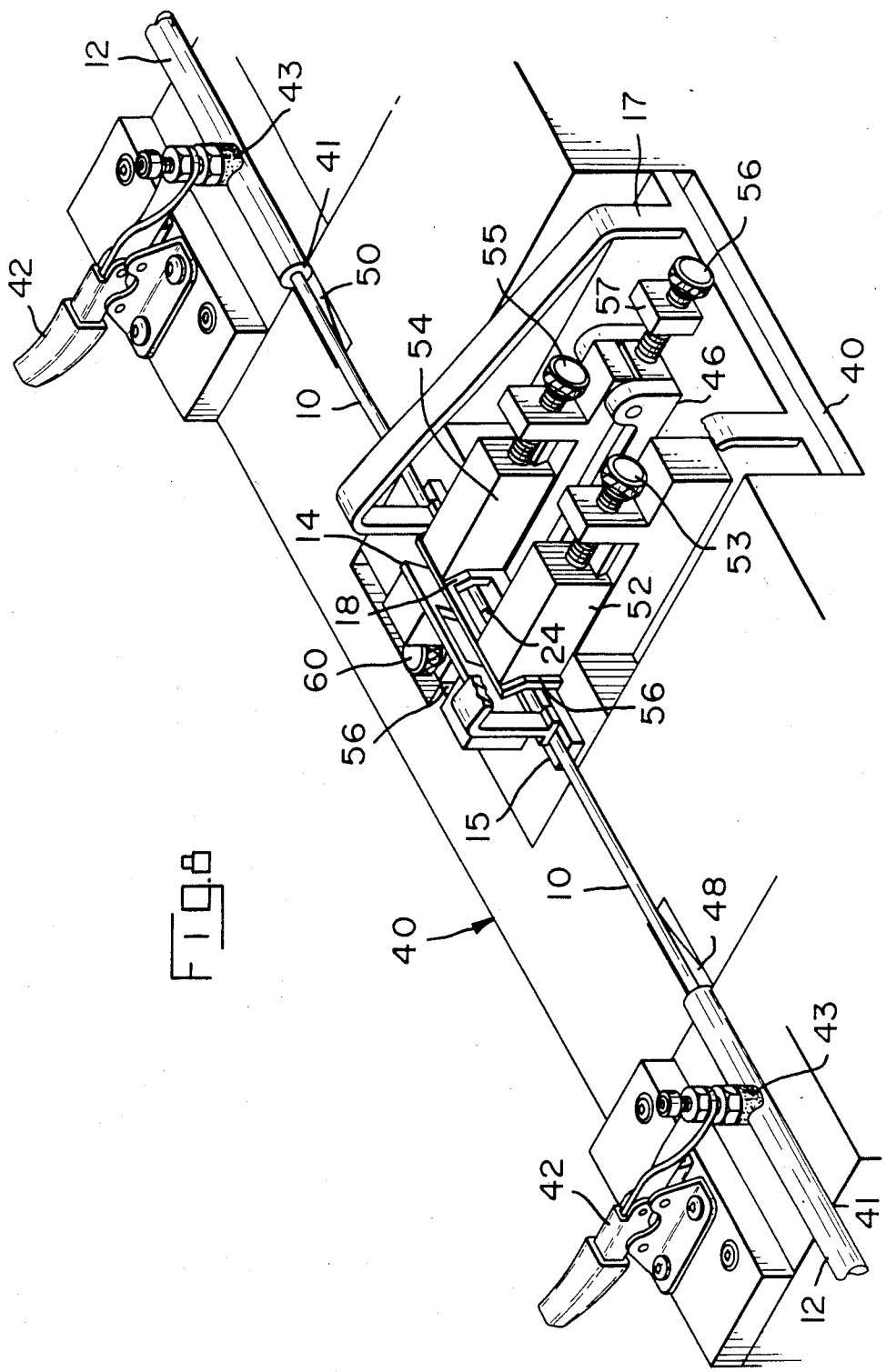

OPTICAL FIBER CONNECTOR

TECHNICAL FIELD

This invention relates to interconnecting optical fibers using a mechanical connector including a deformable support and an encapsulating slug of zero-shrink metal. This invention further relates to a device for employing the connector.

BACKGROUND OF THE INVENTION

The use of optical fibers is becoming increasingly more popular in many industries. Predominant among them is the use of optical fibers in the communication industry. Large amounts of information can be transmitted more efficiently over optical fibers than with electrical transmission through conventional electrically conductive wires.

One technical consideration of the use of optical fibers not present in conventional metal wire conductors is the fact that, when interconnected, it is necessary to align optical fibers in a serial, substantially coaxial and abutting relationship. Many techniques and devices exist to satisfy the requirements for interconnection of optical fibers. Among those are cementing or gluing the end of each fiber to a holder and then aligning the fiber ends secured by those holders within a connector. As it is often desirable to secure the fibers quickly, fast-setting cements and adhesives have been employed for this purpose. Often, however, cyano-acrylic adhesives or other fast-setting cements react chemically with the glass fiber whereby optical transmission loss can occur. Likewise, epoxies, a slower setting class of adhesives, may also involve chemical attack. In order to prevent these deleterious chemical effects, mechanical clamping devices have been recommended. However, mechanical clamping may lead to destruction of optical fibers or often induce local stresses within the fiber itself thereby distorting and degrading the light transmission through the fiber.

In order to more fully comprehend the nature of optical fibers and the requirements for an interconnector therefor, it is necessary to briefly describe conventional manufacturing methods of single-mode optical fibers. Generally, a single-mode optical fiber is created from optical fiber quality glass tubes of ⅜-inch to ¼-inch diameter. These tubes are placed on a lathe and heated with a torch. While undergoing heating, certain gasses such as argon are pumped into the interior of the tube and coat the entire interior surface thereof. As the temperature rises, the tube collapses to become a solid rod which, while molten, is then pulled in the direction of elongation to form a 125 diameter micron thread. The optically transmittive core section, that which includes the residual gas which initially adhered to the interior surface of the tube, has a diameter of approximately 6 index of refraction due to the noble gas coating while the surrounding glass, commonly referred to as the armor, has a high index of refraction.

When drawing the fiber from the molten tube, many forces, i.e., gravity, torque, etc., affect the relative position of the core within the fiber cross section. Thus, merely aligning the optical fibers end-to-end, in a substantially coaxial relationship does not necessarily create maximum transmission through the intersection of joined optical fibers. Indeed, imperfect alignment of the optical cores by more than half a micron, will result in a substantial amount of light transmission loss.

Now turning to the physical aspects of optical fibers, it first should be noted that optical fibers are so fragile that if unshielded, a fiber will shatter upon contact with another. In view of the fragile nature of optical fibers, as well as the necessity for proper connection, great efforts have been expended to overcome the problems associated with interconnection. Conventionally, fibers are coated in a plastic sheath, excepting the ends. The fiber ends then are placed in a holder, usually polymeric, and cemented thereto. When so glued, two holders are then aligned within a connector and cemented with quick-setting adhesives. Often, cyano-arcylic adhesives are employed for this purpose. However, cyano-acrylic adhesives suffer from the above noted shortcoming of chemically reacting with glass fibers and, therefore, generate flaws in the optical fibers and a corresponding loss of optical transmission capacity. Where slower setting epoxies are selected for cementing the holders, similar chemical attack on the fiber may occur due to the hardener, catalyst or other components. Furthermore, the initial alignment of the optical fiber ends may not be preserved due to the necessary setting time and, therefore, an even greater loss of transmission efficiency may occur.

Less common, but also used, are various mechanical clamping devices to secure the fiber ends in an optically transmittive relationship to each other. Mechanical clamping, however, suffers from the shortcoming of subjecting the optical fiber to localized stress which distorts the fiber which again leads to degradation of the light transmission properties of the fiber. Furthermore, in the event too much force is applied in a mechanical clamping context, the fibers will shatter.

SUMMARY OF THE INVENTION

It is, therefore, an object of this invention to overcome the shortcomings and limitations of previous optical fiber interconnectors and interconnection methods.

It is a further object of this invention to provide a means for interconnection of optical fibers which minimizes damage to the optical fibers as well as providing maximum transmission therebetween.

Still another object of this invention is to provide an optical fiber interconnection device which facilitates alignment of the optical cores of abutting fibers in a manner to maximize optical transmission efficiencies.

Yet another object of the invention is to provide a novel interconnection and manipulator therefor which are adapted for use in the field.

These and other objects of the invention are satisfied by an interconnector for optical fibers having a base support for two substantially coaxial, single-mode optical fibers positioned end-to-end in an optically transmittive manner and a meltable slug characterized by a melting point between 100 degrees Celsius and 1000 degrees Celsius, high surface tension and minimal volume shrinkage between the molten state and solid state.

Other objects of the invention are satisfied by a method for connecting single-mode optical fibers by positioning the fibers in a substantially end-to-end manner on a supporting base, clamping the fibers to the base, deforming the base to bring the optical cores of the fibers into substantially coaxial alignment and melting a slug, like that described above, onto the fibers and the base.

Satisfaction of still more objects of the invention is obtained from an alignment device, having a combination of elements including a housing, a distortable, elongated, fiber supporting means, first and second clamp means for clamping the base at different points where one of the clamps translates in two directions relative to the housing which distorts the base and permits coaxial alignment of the optical fibers and a light source and detector that permit determination of the relative position of fibers providing maximum light transmission.

Thus this invention provides a novel approach to satisfying the requirements of the single-mode, optical fiber interconnecting art. The connector and associated methods and devices permit the optical fiber cores to be properly aligned without damage from mechanical manipulation or chemical attack. Furthermore, this invention is easily adapted for use in the field.

The advantages of this invention will become apparent to the skilled artisan upon review of the following description.

BRIEF DESCRIPTION OF THE DRAWINGS

FIGS. 1 through 4 are perspective side views of the sequential assembly of an interconnector in accordance with this invention.

FIG. 5 is a perspective view of a completely assembled interconnector.

FIG. 6 is a cross-sectional view of assembled interconnector.

FIG. 7 is a diagrammatic side view of a clamping and assembly apparatus for use in conjunction with the interconnector of this invention.

FIG. 8 is an exploded perspective view.

DETAILED DESCRIPTION OF THE PREFERRED EMBODIMENT

Figure 9:
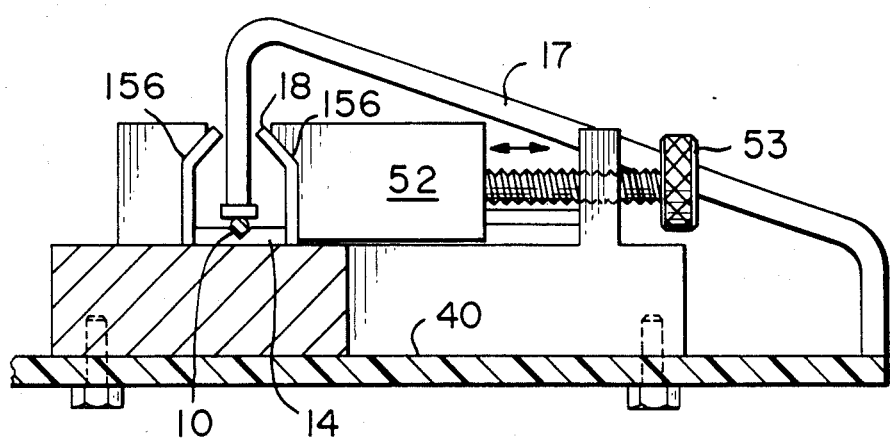
FIGS. 9 and 10 are side views, of said clamping and assembling device for use with said interconnector.
Figure 10:
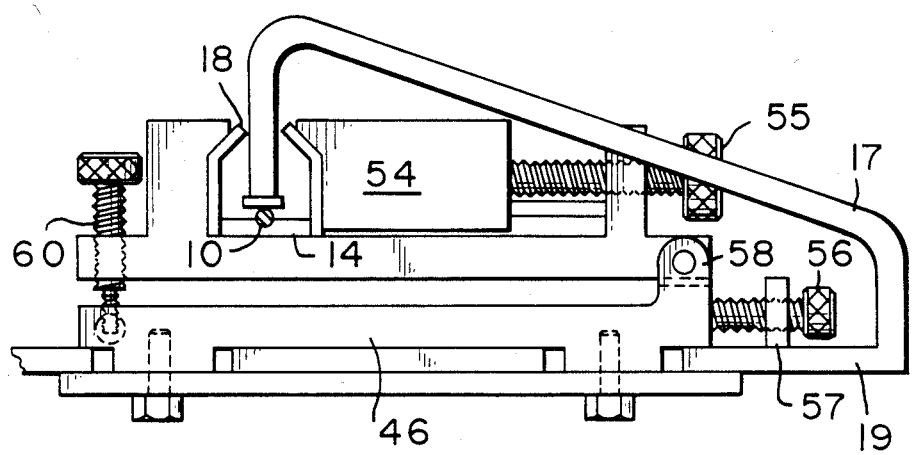

FIGS. 1 through 4 illustrate sequential assembly of the connector of the instant application. Two single mode optical fibers 10 protected by sheathing 12 are ready to be joined at their ends. Sheathing 12 does not cover the fiber end thereby exposing a particular length of glass fiber. That length ideally approximates half of the length of connector member 14 which is characterized by the following: Composition of malleable metal, having an elongated base section 15. The upper surface of base 15 features precision V-shaped groove 16, recesses 23 and upwardly disposed cooperating shoulders 18. Shoulders 18 are composed of the same material as base 15 and contain enlarged openings 20 permitting easy access to the midpoint of groove 16 in base 15. Clamp 17 is also depicted. Clamp 17 comprises planar base 19 and two triangulating elastomeric tipped arms 21 each being separated by a distance slightly greater than the length of shoulders 18. Each arm 21 is arranged to generate clamping force directed toward base 19 and to secure each of fibers 10 resting in groove 16.

FIG. 2 better illustrates the relationship of fibers 10 nested in groove 16. Also, more clearly represented is the length of the exposed ends of fibers 10 which allow the ends to abut or nearly abut at interface 24 in a substantially parallel and coaxial relationship. The relationship of clamps 17 and fibers 10 is clearly illustrated. Elastomeric tipped arms 21 engaged fibers 10 in a lightly compressive manner so as not to distort or damage the fibers. Deposited within connector member 14 is metal alloy slug 22 which is placed directly above interface 24 between shoulders 18 and on base 15. It is to be understood that glass slugs may also be used. Lastly heat-recoverable tube sheathing 26 is depicted in its unrecovered, heat dimensionally unstable state.

FIG. 3 illustrates the appearance of slug 22 subsequent to its exposure to sufficient heat to cause it to melt over junction 24 and onto base 15. Uniform heating of slug 22 is facilitated by openings 20 which permit any conventional heating means, i.e., flame, soldering iron, etc., to be directly applied to slug 22. Direct heating of slug 22 via openings 20 minimizes the necessity of considering the heat transfer properties of metal connecting member 14 which could lead to damage fo fibers 10. Recesses 23 are provided in base 15 so that molten slug 22 may flow under fibers 10. Clamp 17 is then removed upon solidification of slug 22, because the relative position of abutting fibers 10 is fixed.

FIG. 4 depicts connector member 14 after heat-recoverable sleeves 26 have been positioned over the portions of base 16 extending from shoulders 18. Recoverable sleeves 26 have been subjected to sufficient heat to cause shrinking about insulative sheath 12, fibers 10 and base section 15. Further illustrated in FIG. 4 is larger tubular outer sheath member 28 which, after heat recovery of sleeves 26, is positioned over connector member 14 whereby, upon recovery, it encapsulates the entire structure of connector member 14 and sleeves 26. Heat recovery and shrinking of member 28 thereby provides a seal against moisture, dust, etc., which enhances the total reliability of connector member 14.

In FIG. 5, the fully assembled interconnector is illustrated and further highlights the total seal provided by outer covering 28.

FIG. 6, a cutaway side view of the fully assembled inter connector, further highlights the relationship of the components of connector member 14; melted metal slug 22 encased by shoulders 18, first heat-recoverable members 26 shrunken about base 15, optical fibers 10, and first insulative sheathing 12 and the environmental seal provided by heat-recoverable member 28.

Turning now to the desired physical properties of a melted metal slug, it must exert a minimum of force on optical fibers 10. As a result of the fragility of fiber 10, the metal, upon crystallizing, should involve no perceptible shrinkage. Basically, it is necessary for metal slug 22, upon melting, to have sufficient strength to hold the respective ends of optical fibers 10 in a fixed relationship but avoid exertion of compressive forces on or involve chemically damaging reactions relative to the optical fibers.

The material composing metal slug 22 is selected based on the following criteria; melting temperature between 100 degrees Celsius and 1000 degrees Celsius, volume stability between melted and solidified states (zero shrink volume), high surface tension and mechanical retention stability. Zero shrink volume is important because, upon cooling, the metal will not stress fibers 10. The melting temperature is selected to avoid damaging the fibers or the connector and the high surface tension prevents migration of melted slug 22 into the interface 24 of connected fibers 10. Lastly, it is desirable that the alloy is capable of bonding with base member 15 whereby upon cooling the metal slug, the base member and the interconnected optical fibers form a unitary structure. Metal alloys meeting the aforementioned criteria are produced by Cerro De Pasco under the names of Cerrolow 136, Cerrotru or Cerrocast, or any suitable material.

Moving now to the articles employed to seal connector member 14, sleeves 26 and 28 are composed of dimensionally heat-unstable materials. Heat-recoverable materials contemplated for this use in this invention, in the form of heat-recoverable tubes, include polyolefins such as polyethylene or polypropylene. Primarily, the sleeves must be expandable to a heat-dimensionally unstable state which is of sufficient diameter to surround the entire connector (sleeve 28) or selected portions of connector member 14 (sleeves 26). A further consideration is that the sleeves be capable of shrinking to a diameter or configuration which securely engages the various components which they are intended to encapsulate. Lastly, the sleeves should have sufficient strength to engage and seal the connector but not produce a quantum of compressive stress which could damage either the optical fibers or the connector itself. As noted above, minimizing compressive forces eliminates potential for developing local stresses on the optical fibers which may result in physical damage and a corresponding loss of optical transmission.

Referring now to connector member 14, it should be composed of a malleable, machinable, durable material for simplified fabrications. Copper has been found to provide ideal characteristics for practice of this invention. Copper is drawn, extruded, or otherwise machined to produce elongated groove 16 for the single-mode optical fibers 10 may nest therein. Due to the fragility of fibers 10, it is necessary that connector member 14 possess sufficient strength so that localized stresses do not effect the integrity of the interconnection. Furthermore, it is desirable to impart sufficient strength to connector member 14 to prevent distortion upon heat-shrinking of sleeve 28. Shoulders 18 provide a protected enclosure for melting metal slug 22 and interface junction 24 so that shrinkage of the encapsulating sleeves will not change the relative positions of connector member 14, slug 22, and fibers 10. The purpose of connection member 14 being malleable will become clear in the discussion below relating to the connecting process contemplated by this invention.

The procedure followed to effect interconnection of optical fibers 10 is as follows: Fibers 10 are nested in groove 16 in connector member 14 in a manner where they join, forming interface 24 at the substantial midpoint of base section 15. Clamp 17 engages both fibers 10 in order to temporarily hold them in a relatively fixed position. As noted above, mere coaxial alignment of optical fibers 10 may not maximize transmission due to variations in the relative cross-sectional position of the optically transmittive core within each of the fibers. Therefore, by employing a light transmission means associated with one of fibers 10 and a light receiving means associated with the other fiber 10, metal connector 14 may be distorted in order to bring the optical cores into coaxial alignment thereby maximizing optical transmission therethrough. Due to the nature of metal connector member 14, once distorted, it remains so, thereby permanently establishing an optical core/optical core interface between fibers 10. Once established, this positions is fixed by melting slug 22. Upon solidification of slug 22, clamp 17 is removed and sleeves 26 are positioned over fibers 10 and base 15 and heated above their crystalline melting temperature to induce shrinking. Following this step, outer, protective sleeve 28 is positioned over the assembly and subjected to sufficient heat to induce shrinking thereon. Thus, an environmental seal is provided for the fiber interconnection.

In order to efficiently employ the above-described maximum transmission, interconnection assembly and method in the field, a new aligning device is required. In FIG. 7, the cutaway side view of the contemplated device is illustrated. Interconnection actuator 40 performs three major functions. First, it provides releasable locking, over-center, elastomeric tipped clamps 42 each positioned to engage and secure connectable fibers 10 the upper surface of actuator 40. Secondly, actuator 40 includes micrometer adjustable platform 46. A portion of connector member 14 is secured to platform 46, which upon adjustment, distorts base 15. The resulting alignment of the respective optical cores of fibers 10 leads to maximum optical transmission. Lastly, actuator 40 includes intersecting light transmitting means 48 and intersecting light receiving and detecting means 50. As is well known, ligh intersecting fibers 10, at an appropriate angle, is transmittable therethrough or receivable therefrom. Thus, actuator 40 provides a light transmission efficiency detection means.

Moving now to FIG. 8, fibers 10 are nested in grooves 41 formed in the upper suface of actuator 40 and are secured therein by over-center clamps 42. Over-center clamps 42 include concave elastomeric tips 43 lightly compressing fibers 10 and protective sheaths 12 with nondamaging force. The ends of fibers 10 are nested within connector member 14 in an abutting and coaxial manner. Also featured are the intersecting extensions of light transmitting source 48 which intersects fiber 10 at an acute angle to ensure transmission through junction 24 and light detection means 50 which receives the transmitted light.

Fibers 10 are secured in base 15 of connector member 14 by above-described elastomeric tipped clamp 17. It should be noted that the base of clamp 17 is adjustably affixed to platform 46 by lug 57 and micrometer screw assembly 56 (as more clearly depicted in FIG. 9). Platform 46 secures connector 14 and is characterized by adjustable micrometer actuator clamps 52 and 54.

As depicted in FIG. 9, micrometer clamp 52 is affixed to actuator 40 and features coacting and cooperating, curved, block surfaces 156 conforming to the exterior contours of shoulders 18. Clamp 52 is arranged to engage only one side of connector member 14. Clamp 52 is adjusted upon turning micrometer screw 53 and which engages connector member 14 when translated until surfaces 56 abut shoulders 18. Clamp 52 translates in only one direction, the X axis, perpendicular to the direction of elongation of fibers 10.

Clamp 54, translates bidirectionally. In the X axis as well as the Z axis. Clamp 54 is mounted on platform 46 by pivotal bracket 58 located above base 19 of clamp 17. Clamp 54 is arranged to engage connector member 14 along the end opposite that secured by clamp 52. Clamp 54 secures connector member 14 via adjustment of micrometer screw 55 in the same manner as does clamp 52 but additionally is adjustable in the Z axis by micrometer screw 60. Screw 60 is perpendicularly disposed to, and the lower tip thereof abuts platform 46. Screw 60 is located on the opposite side of platform 46 where turning the screw causes clamp 54 to pivot around bracket 58 thereby moving it in the Z axis.

The functional sequence of interconnection actuator 40 used to properly align the optical cores of fibers 10 within connector member 14 is now described. Connector member 14 is placed on platform 46 and secured by clamps 52 and 54 abutting shoulders 18. The cables containing single-mode optical fibers 10 are slidingly received by grooves 41 and brought into an abutting relationship at interface 24 centrally located in connector member 14. Clamps 42 are employed to secure the fiber cables by engaging sheaths 12. Clamp 17 is then adjusted, via mecrometer 56, to hold fibers in groove 16 of base 15. At this point, the serial fiber optic cables are secured by actuator 40 and now are prepared for alignment of their optical cores at interface 24. Light transmission source 48 is activated sending light through the intersecting optical fibers 10 and light detection source 50 detects the light passing therethrough. Therefore, the transmission efficiency is measured. In order to maximize transmission efficiency, as noted above, it is necessary to align the optical cores of the serially aligned fibers 10. The importance of the malleability of connector member 14 now becomes apparent. By turning micrometer screws 55 and 60, the position of clamp 54 relative to platform 46 is adjustable in the X and Z axes, respectively. Because clamp 52 is stationary, translation of clamp 54 in either direction deforms connector 14. During the process of the deformation, in either or both directions, the light transmission efficiency is monitored via a display (not illustrated). When peak efficiency is obtained, presumably upon alignment of the optical cores, metal slug 22 is melted over the fibers thereby fixing the relative cross-sectional positions of fibers 10, in now deformed connector member 14. The remaining steps to effectuate an environmentally, sealed, maximum transmission efficiency, splice between fibers 10, are described above.

The above-described embodiments of the connector, interconnection actuator and methods therefore are provided for the purpose of illustration and not limitation. Variations and modifications of these preferred embodiments which should now be apparent to the skilled artisan are intended to fall within the intent of this invention as defined by the following claims.

We claim:

1. A connector for optical fibers, comprising:
 base means adapted to support a portion of a first optical fiber and a second optical fiber, such that an end of the first optical fiber is adjacent an end of the second optical fiber, the base means having oppositely disposed shoulder elements projecting therefrom, the shoulder elements defining a space therebetween;
 meltable slug means for encapsulating a portion of the first optical fiber, the second optical fiber, and the base means, the slug means being characterized by minimum volume shrinkage upon transition from a melted state to a solid state, high surface tension, and a melting point which can be reached without causing damage to the base means or the optical fibers,
 whereby the slug means is positioned at the intersection of the first optical fiber and the second optical fiber and melted, the slug means flows onto the fibers without migrating into the intersection therebetween, upon cooling, the slug means solidifies with a minimum volume change thereby avoiding compressive forces on the fibers thereby securing the first optical fiber, the second optical fiber, and the base means together.

2. A connector according to claim 1 wherein the base means is a deformable, elongated member.

3. A connector according to claim 2 where said base means is composed of malleable metal and further comprises two shoulders, one each, projecting above and from the opposite, elongated sides of said base means.

4. A connector according to claim 3 where said shoulders have apertures centrally disposed therein and said shoulders curve inwardly over said base means.

5. A connector according to claim 4 further comprising an elongated groove formed along the entire length of said base means and adapted to slidably receive said fibers.

6. A connector according to claim 5 where said slug is composed of a metal alloy which bonds to said base means upon melting and resolidification.

7. A connector according to claim 5 wherein said slug is composed of a glass alloy which bonds to said base means upon melting.

8. A connector according to claim 5 where said shoulders are of a shorter length than said base means.

9. A connector according to claim 8 further comprising heat-shrinkable sleeve members, shrinkable at a temperature which will not damage said fibers, each said member adapted to shrink about a respective fiber and a portion of said base means supporting said respective fiber.

10. A connector according to claim 9 further comprising a heat-shrinkable sleeve element adapted to shrink about said entire base means and said sleeve members thereby sealing said fibers and base means.

11. A connector according to claim 1 where said slug means is composed of a glass alloy which bonds to said base means upon melting.

12. A connector according to claim 1 where said slug is composed of a metal alloy which bonds to said base means upon melting.

13. A connector for single-mode optical fibers, comprising:
 a. an elongated connector member including a base adapted to support a portion of a first optical fiber and a second optical fiber and oppositely disposed shoulder elements projecting upwardly from said base and defining a space therebetween, the optical fibers being aligned such that an end of the first optical fiber is adjacent an end of the second optical fiber,
 b. a meltable slug means for encapsulating a portion of said first and second optical fibers on said base, said slug means being characterized by a melting point temperature between 100 degrees Celsius and 1000 degrees Celsius, minimum volume shrinkage upon transition from a melted state to a solid state and high surface tension,
 c. whereby positioning said slug means on the intersection of said first and second fibers supported by said base and melting said slug means causes said slug means to flow onto said fibers without migrating into the inersection therebetween, and upon cooling, said slug means solidifies with a minimum volume change thereby avoiding compressive forces on said fibers, and securing the first and second fibers together as well as to the base member.

14. A connector according to claim 13 further comprising a groove in said base for nesting said fiber portions therein in a coaxial relationship where said base and shoulder elements are composed of distortable metal and said slug means bonds to said base upon melting and resolidification.

15. A connector according to claim 14 further comprising centrally disposed apertures in said shoulder elements which provide direct access to said slug means by a heating means for heating said slug means thereby minimizing heat transfer by said elongated connector member, and said shoulder elements being curved inwardly over said base to protect the connection between said fibers and metal slug.

16. A connector according to claim 15 where said base defines first and second oppositely disposed projections beyond said shoulder elements for supporting the first and second fibers respectively.

17. A connector according to claim 16 further comprising a first and a second heat-shrinkable sleeve means for shrinking about said first and second base projections and said first and second fibers respectively.

18. A connector according to claim 17 further comprising a third heat-shrinkable sleeve means for surrounding said elongated connector member and said first and second sleeve means whereupon heat-shrinking said third sleeve means environmentally seals the elongated connector member, fibers and sleeve means.

19. A method for interconnection of first and second, coaxial abutting, single mode optical fibers, comprising the steps of:
   a. positioning the fibers, each fiber having an optically transmissive core, on a supporting base in an end-to-end manner,
   b. clamping the fibers on the base,
   c. deforming the base in a manner to bring the optical cores of the fibers into coaxial alignment and
   d. melting a slug over the ends of the fibers in a manner not physically damaging thereto where the slug material does not migrate into the intersection of the fibers, and where the fibers are permanently secured to each other and the base in an optically transmissive relationship.

20. A method according to claim 19 where the base has upwardly projecting shoulders defining a cavity adapted to receive the fibers and has an elongated groove centrally disposed along the base, the method further comprising the steps of nesting the fibers in the groove where the ends of the fibers substantially abut in the cavity defined by the shoulders and unclamping the fibers from the base after melting of the slug.

21. A method according to claim 20 where said shoulders have centrally disposed apertures therethrough, further including the steps of directly applying heat to the slug and minimizing heat transfer to the base and shoulders.

22. A method according to claim 21 further comprising the steps of positioning a heat shrinkable member to surround a connector and shrinking the member around the connector.

23. A method according to claim 19 further comprising the steps of transmitting light through the fiber intersection and detecting the quantum of light transmitted therethrough.

24. A method according to claim 23 where the base is distorted until the maximum detectable quantum of light passes from the first fiber to the second fiber and the relative position of fiber ends is fixed by melting the slug.

25. A combination of elements for temporarily aligning and securing a first and a second, coaxial, single-mode, optical fiber, each characterized by an optically transmissive core, in such manner so as to permit a meltable slug or the like to be applied to the intersection of the two fibers, the combination comprising:
   a housing;
   an elongated, distortable base for supporting ends of said fibers in a substantially abutting relationship, the base cooperating with a portion of the fibers, such that another portion of the fibers remains exposed;
   a retention means having a first clamp means and a second clamp means, the retention means being independently movable from the base;
   the first clamp means for clamping a first portion of said base to said housing, the first clamp means positioned to cooperate with the first fiber proximate the end of the first fiber;
   the second clamp means for clamping second portion of said base to said housing, said second clamp means being translatable substantially along at least two axes relative to said housing, the second clamp means positioned to cooperate with the second fiber proximate the end of the second fiber, said second clamp means spaced from the first clamp means to provide the spacing requred to allow the meltable slug or the like to be applied to the exposed portion of the fibers proximate the intersection thereof;
   whereby clamping said first base portion with said first clamping means and clamping said second base portion with said second clamping means and translating said second clamping means distorts said second base portion relative to said first base portion thereby aligning the optical cores of the fibers in a substantially coaxial alignment.

26. A combination according to claim 25 further comprising a light transmitting means transmissively connected to the first fiber and a light receiving means transmissively connected to said second fiber, said transmitting and receiving means being contained within said housing.

27. A combination according to claim 26 further comprising a light source associated with said transmitting means and a light detector associated with said receiving means where light from said source is transmitted into said first fiber and then said second fiber where said detector measures the amount of light passing through said fibers.

28. A combination according to claim 27 further comprising a first and a second releasable securing means for securing the first and second fibers to said housing.

29. A combination according to claim 28 further comprising a fiber clamping means for releasably clamping said first and second fibers to said base, and a fiber clamping adjustment means for adjustably securing said fiber clamping means to said housing.

30. A combination according to claim 29 further comprising a first, second and third adjustment means, said first adjustment means for translating said first clamp means and said second and third adjustment means for translating said second clamp means.

31. A combination according to claim 30 where said adjustment means are micrometer screws and where said second clamp means is pivotally connected to said housing.

32. A combination according to claim 31 further comprising a meltable metal slug means for securing said two substantially abutting fibers ends to said base in a manner which is not damaging to said fibers.

* * * * *